Aug. 7, 1928. 1,679,459

P. W. WILLANS ET AL

TUNING DEVICE FOR RADIO RECEIVING SETS

Filed Jan. 14, 1925 2 Sheets-Sheet 1

INVENTOR
P. W. WILLANS AND
ARTHUR STANLEY
BY
ATTORNEY

Aug. 7, 1928.  1,679,459
P. W. WILLANS ET AL
TUNING DEVICE FOR RADIO RECEIVING SETS
Filed Jan. 14, 1925   2 Sheets-Sheet 2

INVENTOR
P. W. WILLANS AND
ARTHUR STANLEY
BY
ATTORNEY

Patented Aug. 7, 1928.

1,679,459

UNITED STATES PATENT OFFICE.

PETER WILLIAM WILLANS, OF TOWCESTER, AND ARTHUR STANLEY, OF BLOOMFIELD, NEAR CHLEMSFORD, ENGLAND, ASSIGNORS TO RADIO CORPORATION OF AMERICA, A CORPORATION OF DELAWARE.

TUNING DEVICE FOR RADIO RECEIVING SETS.

Application filed January 14, 1925, Serial No. 2,366, and in Great Britain January 16, 1924.

This invention relates to tuning devices for radio receiving sets and its object is to provide simple means whereby the wave length of circuits can be readily and progressively varied within wide limits.

According to this invention a variometer comprises two pairs of flat spiral coils, the two coils of one pair being exactly similar to one another and mounted coaxially with one another, while the two coils of the other pair are also identically similar to one another and are mounted coaxially with one another, the two axes being parallel to one another and the two coils of one pair being of different inductance from those of the other, and upon an axis which is parallel to these two axes and equidistant from them is mounted a shield or screen in such a way that it can be rotated so as to lie between the two coils of either pair and thus screen a greater or less part of one coil from the other coil of the pair. Thus the effective inductance of either pair will depend upon the position of the shield. The shield is substantially in the form of a sector of a circle but by suitably shaping it, it is possible to obtain a change of wave length which varies directly with the angular movement of the shield.

In conjunction with this variometer may be employed a four position switch by means of which either pair can be included in circuit as desired and the two coils of either pair may be connected in series or in parallel.

Figure 1:
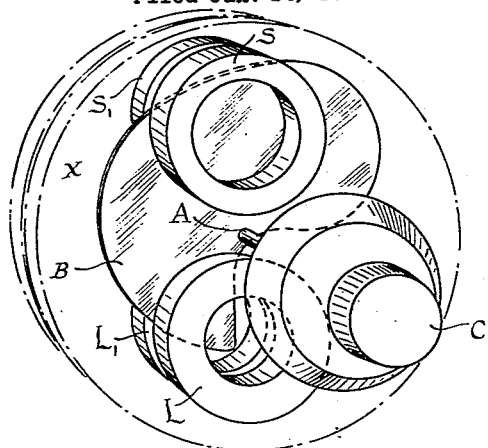
Figure 2:
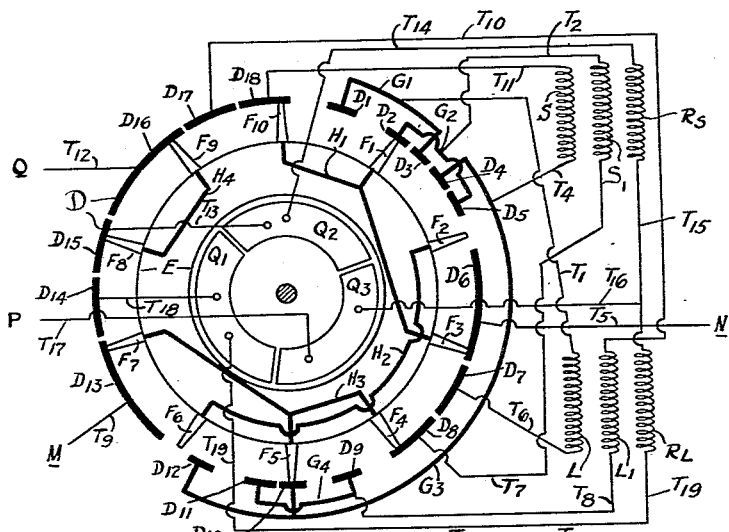
Figure 3:
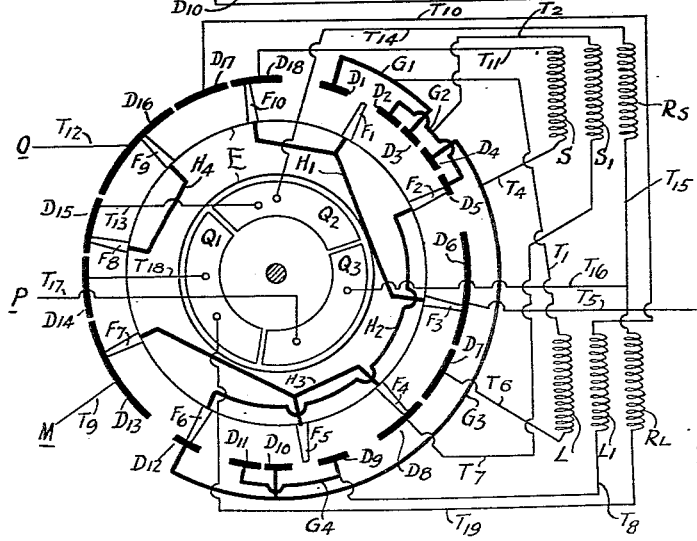
Figure 4:
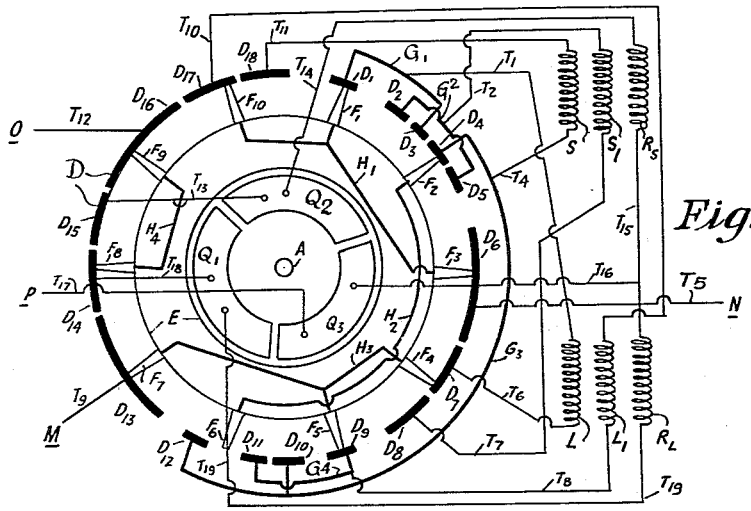
Figure 5:
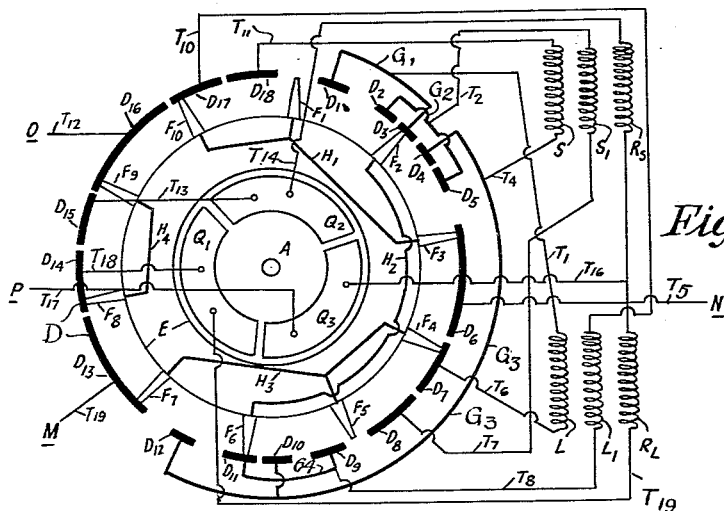
Figure 6:
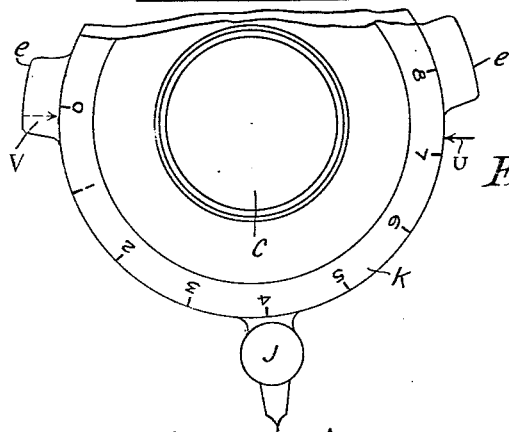

Our invention is illustrated by the accompanying drawings in which Fig. 1 is a perspective view of a variometer made in accordance with this invention; Fig. 2 is a diagrammatical representation of the invention showing the switch for connecting the coils in circuit; Figs. 3, 4 and 5 are diagrammatical representations similar to Fig. 2 showing the switch in its different positions; and Fig. 6 is a view showing the scale for determining the value of the inductance.

L, $L_1$, are two coils which are similar to one another and are mounted coaxially and S, $S_1$, are two other coils which are similar to one another and are mounted coaxially, the axes of the two pairs of coils being parallel to one another. Midway between the two axes and parallel to them is a spindle A which carries a shield B and which can be turned by means of a knurled head C so as to cause a greater or less portion of the shield as desired to lie between the coils L, $L_1$, or between the coils S, $S_1$, so that the effective inductance of either pair of coils will depend upon the position of the shield.

In conjunction with such a variometer we preferably employ a switch, by means of which the coils S, $S_1$, may be connected in circuit either in series or in parallel or the coils L, $L_1$, may be so connected. The switch comprises a number of conducting segments D arranged round an insulating holder. A convenient method of forming these segments is to mount upon the holder a complete ring and then to divide this ring by saw cuts into the required number of segments. Each segment is secured to the holder by a screw or screws which are screwed in before the saw cuts are made. This method of construction has the advantage that the segments must come in their correct sequence whereas if the segments were cut to size before they were fixed in position it would be necessary to have many different sizes and there would be risk of their being fixed in the wrong sequence.

The screws may also secure in position tabs to which external connections can be soldered.

The switch also comprises a rotatable part E of insulating material and carrying ten equally spaced brushes $F_1$ to $F_{10}$, each of which contacts with one or other of the segments $D_1$ to $D_{18}$ as the part E is rotated.

Certain of the segments are interconnected as shown by wires $G_1$ to $G_4$ and certain of the brushes are interconnected by wires $H_1$ to $H_4$.

In the arrangement shown the arrangement of the segments may be most readily described by considering the holder as divided into 40 sections. In Fig. 2 segment $D_1$ occupies approximately one section. The second section on the holder proceeding in a clockwise direction has no conducting segment; the third, fourth, fifth and sixth sections of the holder are occupied by segments $D_2$, $D_3$, $D_4$ and $D_5$ respectfully, the segments being separated by saw cuts to insulate them. The seventh section of the ring has no segment. The next four sections (8 to 11) of the ring are occupied by a single wide segment $D_6$. Two double width segments $D_7$ and $D_8$ separated by a saw cut occupy the next four sections (12 to 15). Following these is a single width blank space (section 16) on the ring, then segment $D_9$ (section 17) another single width blank space (section 18) the single width segments $D_{10}$ and $D_{11}$ (sections 19 and 20) followed by another space (section 21) and another single width segment, $D_{12}$ (section 22) and a single width space (section 23). The remainder of the circumference is occupied by segments $D_{13}$ having a width of four spaces (sections 24 to 27), $D_{14}$ and $D_{15}$ two spaces each (sections 28 to 31), $D_{16}$ four spaces (sections 32 to 35) and $D_{17}$ and $D_{18}$ two spaces each (sections 36 to 39). $D_{18}$ and $D_1$ are separated by a space of approximately one section (section 40).

Segments $D_1$ and $D_3$ are conductively connected by $G_1$ which has a lead $T_1$ extending to one end of coil L. Segments $D_2$ and $D_5$ are connected by $G_2$ which has a lead $T_2$ to one end of coil $S_1$. A conductor $G_3$ connects segments $D_4$ and $D_{12}$ and a lead $T_4$ connects from $G_3$ to one end of coil S. $T_5$ is a lead connected to segment $D_6$ which extends to the terminal N. Segment $D_7$ is connected by lead $T_6$ to the other end of coil L opposite the connection of lead $T_1$. Lead $T_7$ is connected between segment $D_8$ and the other end of coil $S_1$. Segments $D_9$ and $D_{11}$ are connected together by conductor $G_4$ and the latter is connected by lead $T_8$ to one end of coil $L_1$. Segment $D_{10}$ is connected to $G_3$ and thus to $D_{12}$ and $D_4$.

Segment $D_{13}$ is connected to terminal M by lead $T_9$. The connection to $D_{14}$, $D_{15}$ and $D_{16}$ will be described subsequently.

Segment $D_{17}$ is connected by lead $T_{10}$ to the other end of coil $L_1$ and $D_{18}$ is connected by lead $T_{11}$ to the other end of coil S. Brushes $F_1$, $F_3$ and $F_{10}$ are connected together by conductor $H_1$. Brushes $F_2$ and $F_6$ are connected together by $H_2$. Brushes $F_4$, $F_5$ and $F_7$ are connected together by conductor $H_3$. Brushes $F_8$ and $F_9$ are connected together by $H_4$.

The part E has fast with it a handle J (Figure 6) by which it can be turned into any one of four positions as shown in Figures 2, 3, 4 and 5. In the position shown in Figure 2 it will be seen that the coils S, $S_1$, are connected in parallel between the points M N, while the coils L, $L_1$ are unconnected.

The two parallel circuits from M to N may be traced as follows (1) Conductor $T_9$, segment $D_{13}$, brush $F_7$, conductor $H_3$, brush $F_5$, segment $D_{10}$, conductors $G_3$ and $T_4$, coil S, conductor $T_{11}$, segment $D_{18}$, brush $F_{10}$, conductor $H_1$, brush $F_3$, segment $D_6$, conductor $T_5$ to terminal N; (2) conductor $T_9$, segment $D_{13}$, brush $F_7$, conductor $H_3$, brush $F_4$, segment $D_8$, conductor $T_7$, coil $S_1$, conductor $T_2$, conductor $G_2$, segment $D_2$, brush $F_1$, conductor $H_1$, brush $F_3$, segment $D_6$, conductor $T_5$, to terminal N. Coil $L_1$ is disconnected because the segment $D_{17}$ connected thereto is not in contact with a brush and the other segments $D_9$ and $D_{11}$ connected to the opposite ends are likewise out of contact with brushes. It will be noted that segments $D_7$, $D_1$ and $D_3$ which connect to coil L are likewise out of contact with the brushes as a result of which coils L and $L_1$ are out of the circuit as stated heretofore.

In position 2 shown in Figure 3 the coils S, $S_1$, are connected in series between the points M N and the coils L, $L_1$, are again unconnected. The series circuit from point M to point N through coils $S_1$ and $S_2$ may be traced as follows:

From terminal M to segment $D_{13}$, brush $F_7$, conductor $H_3$, brush $F_4$, segment $D_8$, conductor $T_7$, coil $S_1$, conductors $T_2$ and $G_2$, segment $D_5$, brush $F_2$, conductor $H_2$, brush $F_6$, segment $D_{12}$, conductors $G_3$ and $T_4$, coil S, conductor $T_{11}$, segment $D_{18}$, brush $F_{10}$, conductor $H_1$, brush $F_3$, segment $D_6$, conductor $T_5$ to terminal N. Coil $L_1$ is disconnected because no brush is in contact with segments $D_9$, $D_{11}$ or $D_{17}$ which are connected to the ends of the coil $L_1$. Likewise coil L is disconnected because segments $D_7$ and $D_1$ and $D_3$ are not in contact with brushes.

In position 3 shown in Figure 4 the coils L, $L_1$, are connected in parallel between the points M N and the coils S, $S_1$, are unconnected. The two parallel circuits from point M to N through coils $L_1$ and $L_2$ may be traced as follows:

(1) Conductor $T_9$, segment $D_{13}$, brush $F_7$, conductor $H_3$, brush $F_5$, segment $D_9$, conductor $T_8$, coil $L_1$, conductor $T_{10}$, segment $D_{17}$, brush $F_{10}$, conductor $H_1$, brush $F_3$, segment $D_6$, conductor $T_5$ to terminal N. (2) Conductor $T_9$, segment $D_{13}$, brush $F_7$, conductor $H_3$, brush $F_4$, segment $D_7$, connection $T_6$, coil L, connection $T_1$, conductor $G_1$, segment $D_1$, brush $F_1$, conductor $H_1$, brush $F_3$, segment $D_6$, connection $T_5$, to N. S is disconnected because the segment $D_{18}$ is not in contact with a brush. Likewise the coil $S_1$ which is connected to segments $D_2$, $D_5$ and $D_8$ is out of contact with any brush.

In position 4 shown in Figure 5 the coils L, $L_1$, are connected in series between the points M N and the coils S, $S_1$, are unconnected.

The series connection of coils $L_1$ and $L_2$ may be traced as follows:—

From M through conductor $G_{19}$ to segment $D_{13}$, brush $F_7$, conductor $H_3$, brush $F_4$, segment $D_7$, conductor $T_6$, coil L, conductor $T_1$, connection $G_1$, segment $D_3$, brush $F_2$, conductor $H_2$, brush $F_6$, segment $D_{11}$, conductor $G_4$, connection $T_8$, coil $L_1$, connection $T_{10}$, segment $D_{17}$, brush $F_{10}$, connection $H_1$, brush $F_3$, segment $D_6$, connection $T_5$ to terminal N. Coil S is unconnected because the segment $D_{18}$ is connected to one end of it through conductor $T_{11}$ is not in contact with a brush. Likewise coil $S_1$ which is connected to segments $D_2$, $D_5$ and $D_8$ is not in contact with the brushes.

The value of the inductance of either pair of coils S, $S_1$, and L, $L_1$, may be read on a scale K which is fast with the head C against a fixed index U for the coils L, $L_1$, and V for the coils S, $S_1$.

In order to avoid possibility of mistake by using the wrong index the part E is provided with two lugs e one of which masks one of the indices U in any position of the switch.

The connection of the coils L, $L_1$, S, $S_1$, is effected by means of eight only of the ten brushes, those marked $F_8$ and $F_9$ not being required for this purpose. They may, however, be employed to connect reaction coils $R_S$, $R_L$, and if they are required for this purpose three conducting segments $Q_1$, $Q_2$, $Q_3$, are mounted on the fixed part.

The circuit of the reaction coil $R_S$ in Fig. 2 is from terminal O, lead $T_{12}$, segment $D_{16}$, brush $F_9$, connection $H_4$, brush $F_8$, lead $T_{13}$, segment $Q_2$, lead $T_{14}$, coil $R_S$, leads $T_{15}$ and $T_{16}$, segment $Q_3$, lead $T_{17}$ to terminal P. Coil $R_L$ is disconnected as the segment $D_{14}$ connected to the lower end is not in contact with a brush. In Fig. 3 the circuit connection is likewise through $R_S$ through the same connections.

In Figs. 4 and 5 the coil $R_L$ is connected in circuit between O and P the connections being lead $T_{12}$, segment $D_{16}$, brush $F_9$, connection $H_4$, brush $F_8$, segment $D_{14}$, lead $T_{18}$, segment $Q_1$, lead $T_{19}$, coil $R_L$, lead $T_{16}$, segment $Q_3$, lead $T_{17}$ to terminal P. $R_S$ is disconnected because segment $D_{15}$ is not in contact with a brush.

Having described our invention what we claim is as follows:—

1. A variometer comprising two pairs of inductance coils, the two coils of each pair being similar to one another and mounted coaxially, and an irregular shaped shield mounted upon an axis parallel to the axes of the coils in such a way that it can be rotated so as to lie between the coils of either pair, whereby the inductance of the variometer may be varied in accordance with a predetermined law.

2. In a tuning device for radio receiving sets, the combination of a variometer as claimed in claim 1 with a four position by which the coils of either pair can be connected in circuit either in series or in parallel, substantially as described.

3. In a tuning device for radio receiving sets, the combination of a plurality of pairs of coils, a single means for selectively connecting said coils in series or in parallel, and means to vary the inductance between the coils of said pairs, the coils of said pairs being permanently fixed relative to each other 4. In a variometer, the combination of a plurality of pairs of coils fixedly mounted on mutually parallel axes, means for connecting the desired pair of said plurality for active use, a manually operable member having angular movement, and means associated with said member to vary the inductance of the coils in active use.

5. In a variometer, the combination of a plurality of pairs of coils, means for connecting the desired pair of said plurality for active use, a shield mounted for angular displacement and adapted to be interposed between the coils of each of said pairs for varying the inductance of the active coils, and manual means for moving said shield, said shield being shaped so that unequal areas thereof may be interposed between the coils by equal increments of movement of the manual means.

6. A variometer comprising a plurality of pairs of inductance coils, the two coils of each pair being similar to one another and mounted coaxially, and a shield mounted in such a way that it can be adjusted to vary the inductance of any of said pairs of coils.

7. A variometer for tuning a circuit comprising a plurality of pairs of inductance coils, the two coils of each pair being similar and the coils of different pairs being dissimilar, means for connecting the coils of any pair in the circuit to make that pair active and means for varying the inductance of the coils of the active pair.

8. A variometer, according to claim 4, in which the means for connecting the desired pairs of said plurality for active use also is adapted to vary the inductance of the coils in active use.

9. A variometer for tuning a circuit comprising a plurality of pairs of inductance coils, the coils of each pair being similar and the coils of different pairs being dissimilar, means for connecting the desired coils of said plurality of pairs for active use in said circuit and for varying the inductance of the coils in active use, and a second means for further varying the inductance of the coils in active use.

10. A variometer for tuning a circuit comprising a plurality of pairs of inductance coils, fixedly mounted on mutually parallel axes, the coils of each pair being similar and the coils of different pairs being dissimilar, means for connecting the desired coils of said plurality of pairs for active use in said circuit and for varying the inductance of the coils in active use, and a second means for further varying the inductance of the coils in active use without changing the relative positions of the coils.

11. A variometer for tuning a circuit comprising a plurality of pairs of inductance coils, the coils of each pair being similar and the coils of different pairs being dissimilar, means for connecting any pair of the coils in parallel for one adjustment and in series for another adjustment, said means also disconnecting the remainder of said coils for both adjustments, and a second means for varying the inductance of the connected coils for either adjustment.

12. A variometer, according to claim 11, in which the second means consists of a metallic shield adapted to be manually moved to vary the inductance.

13. A variometer, according to claim 11, in which the second means consists of a metallic shield interposed between the coils of the connected pair.

PETER WILLIAM WILLANS.
ARTHUR STANLEY.